3,245,784
Patented Apr. 12, 1966

3,245,784

LITHOGRAPHIC MASTER AND PROCESS OF PREPARATION

Buck Stricklin, Maplewood, Minn., assignor to Minnesota Mining and Manufacturing Company, St. Paul, Minn., a corporation of Delaware No Drawing. Filed Oct. 16, 1961, Ser. No. 145,426
9 Claims. (Cl. 96—1)

This invention relates to the preparation of new and useful photoconductive lithographic printing plates from dye-sensitized photoconductor sheet materials and masters thereof. More specifically, a direct image lithographic plate is prepared by electrolytic deposition of an oleophilic material in image-wise fashion on a hydrophilic surface prepared by uniformly coating a photoconductive sheet material with a hydrophilic layer. Preferred photoconductive sheet materails are disclosed in U.S. patent application S.N. 692,529, filed October 28, 1957, now U.S. 3,010,884.

Lithographic masters are employed in all types of reproductions, ranging from color reproductions of many copies to simple reproduction of printed matter requiring only a few copies. Direct image lithographic masters used for "short run" (100–1000 copies) reproductions have ink-receptive (oleophilic) images applied to the surface of a hydrophilic layer which is preferentially receptive to water as compared to the oleophilic image.

Generally speaking, oleophilic images in the case of simple reproductions with direct image lithographic plates have been applied to the hydrophilic layer by direct inscription with a pencil, crayon, typewriter or other similar device. In this invention, photo-deposited direct-image lithographic plates are prepared in an economical and convenient manner which are readily adapted to simple reproductions of printed matter. For instance, direct-image lithographic masters are readily prepared from microfilm by the techniques taught in this invention.

In accordance with this invention, it has been discovered that direct-image photo-lithographic printing plates having characteristics suitable for commercial usage are produced by uniformly top-coating a dye-sensitized photoconductive sheet with a transparent water insoluble hydrophilic layer. The master sheet is then prepared by superimposing on this hydrophilic layer, an oleophilic image selectively deposited on light-exposed portions of the photoconductive sheet material.

Light exposure of the lithographic plate is preferably by direct projection as through a photographic negative. In this manner, the areas of the sheet which are exposed to light are rendered photoconductive, whereas the unexposed areas are not conductive. This difference in conductivity is then employed to deposit an oleophilic image on the exposed areas. The preferred method for depositing the image is electrolytic deposition.

In the electrolytic deposition method, the photoconductor particles are in contact with a conductive backing, such as aluminum foil or other suitable metal. The condutive backing may also be a vapor-coated deposit on the surface of suitable material, such as polyethylene terephthalate film. In every instance, the photoconductor particles are maintained in conductive contact with the backing by means of a hydrophobic binder which also serves to minimize moisture absorption of the photoconductor layer.

The hydrophilic surface of the lithographic plate is prepared by over-coating the photoconductor sheet with a uniform and continuous layer of a transparent water insoluble hydrophilic layer. When the oleophilic image is to be deposited by electrolytic deposition, it is also necessary that this layer also be water permeable. A convenient manner of applying this hydrophilic layer is by knife coating a solution or dispersion of the hydrophilic material to be used and to subsequently dry the sheet. Other suitable methods include spraying and dipping.

Hydrophilic matrials which may be used in the preparation of a transparent water insoluble and water permeable hydrophilic top coat include film-forming colloids of proteins, gums, synthetic polymers, cellulosic materials, and certain silicas. Illustrative gums are mesquite, karaya, arabic, locust bean, guar, ammonium alginate and sodium alginate. Illustrative proteins are casein, soya bean proteins, zein, blue (animal), gelatin, albumin (egg) and albumin (blood). Synthetic hydrophilic colloidal materials which include chemically modified cellulosic materials are carboxyl methyl cellulose, methyl cellulose, hydroxy ethyl cellulose, polyvinyl alcohol and polyacrylamide. Illustrative cellulosic materials are starch, dextrin, pectins, and derivatives thereof including fibrous sodium pectate. These film-forming materials are insolubilized from their colloidal state directly, such as by heating, or with various substances known to function in this manner, such as tanning agents, aldehydes, heavy metal salts, organic titanates and chromium complexes.

The oleophilic imaging material is, generally speaking, a water insoluble organic which becomes receptive to inks (oil based) and water repellent upon deposition on the photoconductor surface. Heating the oleophilic image has been found to increase the press life of the lithographic plates in many instances. In the electrolytic deposition of the oleophilic image, solutions and dispersions of electrically-charged organic molecules containing a non-polar hydrophobic oleophilic moiety are primarily contemplated. Also contemplated is the deposition of other imaging materials by the selective destruction of an emulsion or similar substance in the image areas, thereby producing an oleophilic image from the emulsified components using the electrolytic deposition techniques described in this invention.

Especially useful are organic chelates or coordination compounds which contain hydrocarbon radicals (12 to 18 carbon atoms preferably) and amine derivatives such as amine salts or quaternaries. Illustrative of these classes of compounds are Werner type chromium complexes of fatty acids such as Quilon, chrome complex, a product of E. I. du Pont de Nemours & Co. (Inc.), Wilmington, Delaware; various fatty amine derivatives such as the Armeens and Arquads, products of Armour Industrial Chemical Company, Chicago, Illinois, and amino-containing resins such as Versamid resins, products of General Mills, Inc.

PREPARATION OF PHOTOCONDUCTIVE SHEET

Zinc oxide, USP 12 (33.5 parts by weight); titanium dioxide (5 parts by weight); a hydrophobic binder mixture of a 30:70 copolymer of butadiene and styrene (13.3 parts by weight) and polystyrene (4 parts by weight) and toluene (11.8 parts by weight) were mixed in a ball mill for 8 hours until a smooth dispersion was obtained. This dispersion was mixed with "Phosphine R" (0.01 part by weight), a product of the General Dyestuff Corporation, New York, N.Y. The resulting mixture was filtered through a 325 mesh screen and coated at a wet thickness of .007 inch on a 3 mil aluminum backing. The resulting sheet material after air drying represented an excellent photoconductor sheet material for use in the preparation of lithographic plates.

*Example 1*

Zinc oxide photoconductor sheet prepared as shown above was top-coated with a solution composed of a polyacrylamide (2.5 g.) PAM 100, a product of American Cyanamid, 1 g. glycerine, and 1 g. of methacrylato chromic chloride in 100 g. of water. The solution was knife coated on the surface of the photoconductor at an orifice of 1.5 mils and air dried. The sheet was then dark adapted by storage in the dark overnight. Selected portions of the dark-adapted sheet material were exposed to tungsten light source for 15 seconds at an intensity of approximately 200 foot candles, thereby making the exposed areas photoconductive. An oleophilic image of hexadecyl amine was deposited on the photoconductor areas by electrolytic development as follows:

(1) A developer solution was applied to the surface of the photoconductor sheet with a sponge. The developer solution was prepared by dissolving hexadecylamine (20 g.) in 100 g. of hot ethyl alcohol, adding the alcohol solution to a mixture of water (100 g.) and concentrated hydrochloric acid (3 cc.), adding additional water (1 liter) and finally adjusting the pH of the solution to between 3–4.

(2) An electrical current was passed through the conductive portions of the photoconductor sheet by applying an electrical potential (15–30 volts) between the sponge serving as the positive pole and the aluminum backing of the photoconductor sheet which is connected to the power source, wherein the sponge remains in contact with all portions of the photoconductor sheet for about 1 second.

The resulting combination of hydrophilic surface (polyacrylamide) and oleophilic (fatty polyamine) image functioned as a lithographic master of excellent quality. Three hundred copies were prepared from the plate and all were excellent reproductions of the original image to which the plate was exposed.

*Example 2*

Photoconductor sheet material prepared as shown above was top-coated using a knife coater set at a 2 mil orifice with an aqueous solution of cellulose gum-free acid (1 g.) and glycerine (0.1 g.) per 100 g. of water and air dried, resulting in a uniform hydrophilic surface, the cellulose gum-free acid was prepared from sodium carboxymethylcellulose in an ion exchange column filled with Dowex 50–X8 cation exchange resin, a product of Dow Chemical Co., to remove the sodium ions and to obtain the acid form of carboxy-methylcellulose (cellulose gum-free acid). After dark adapting the sheet material by storage in the dark overnight, the resulting lithographic plate was exposed to a light image, thereby rendering photoconductive the exposed areas. An oleophilic image was then deposited on the photoconductive portions by the procedure set forth in Example 1. In this example the oleophilic imaging material was a solution of a polyamide resin prepared from polymeric fat acids and polyamines. The polyamide resin had an amine number of about 90, a softening point (ASTM E28–51T) of about 50° C., a viscosity of about 15 at 150° C., as measured by a Brookfield viscometer, and a specific gravity of 0.98. The solution was prepared by dissolving the polyamide resin (27.5 g.) in boiling ethanol (100 g.), the hot solution was then added slowly, with stirring, to water (100 g.) acidified with concentrated hydrochloric acid (2 cc.) and the mixture was then added to water (1 liter) with agitation.

The difference in wettability between the hydrophilic layer and the oleophilic image represented an excellent lithographic master as evidenced by the clear and distinct reproductions made possible.

*Example 3*

The lithographic plate of Example 2 was selectively exposed to tungsten light for 15 seconds and an oleophilic image deposited on the exposed areas using the development procedure of Example 1 and a 3% by weight aqueous solution of the Werner type chromium complex of stearic acid, as the developer solution. After deposition of the stearic acid image, the lithographic master was heated for 3 minutes with an infra-red heat source, such that the sheet was dry and the oleophilic image was firmly anchored to the hydrophilic layer. The resulting master was observed to be more durable than comparable masters in which the oleophilic image had not been subjected to elevated temperatures following the deposition of the image.

*Example 4*

Photoconductor sheet material prepared as shown above was top-coated with a formulation containing colloidal silica (70 g.), Nalcoag 1034A, a product of Nalco Chemical Co., Chicago, Illinois, methyl alcohol (7 g.), and water (22.3 g.). After being air dried and dark adapted, the resulting lithographic plate was exposed to a light image. The developer solution described in Example 1 was then employed to selectively deposit an oleophilic image on the exposed areas to produce a lithographic master which had exceptionally good hydrophilic-oleophilic balance.

*Example 5*

The lithographic plate of Example 4 was selectively exposed to light. An aqueous solution of 1-ethyl-quinaldinium iodide (3%) and butyl pyridinium bromide (1%) was electrolytically deposited on the areas of the lithographic plate rendered photo-conductive by exposure to light. The resulting offset master was employed to reproduce 200 clear prints of the light image to which the photoconductor particles were exposed.

It will be appreciated that dye sensitization of the photoconductor particles is a known technique for broadening the spectral response of the photoconductor. As such, the selection and concentration of the dye will vary with sensitivity required. The sensitivity required may vary with intensity and source of the light and the photoconductor employed. A tungsten light source is quite adequate and need not be changed except for special applications. In addition to phosphine R (CI 788), Patent Blue (CI 672), Eosine and xylene cyanol (CI 715) may be used to advantage when a tungsten light source is used. With the use of these dye-sensitized photoconductors and the increased conductivity made possible by the dyes, it is generally possible to produce the desired oleophilic image with current of 1 to 100 milliamperes per square centimeter at a plate voltage of 15 to 30 volts and a development time of from 1 to 5 seconds.

Zinc oxide is the preferred photoconductor because of its white color, availability, physical properties, etc. On the other hand, other photoconductor oxides such as indium oxide, and sulfides, such as cadmium sulfide, are suitable for use in the preparation of lithographic plates.

I claim:

1. A process for the preparation of a direct-image photo lithographic master which comprises selectively exposing the surface of a direct image photo lithographic printing plate comprising a photoconductive sheet material uniformly top-coated with a transparent water insoluble hydrophilic layer to a light image so as to render the exposed area photoconductive and depositing an oleophilic image on the photoconductive areas of the lithographic plate.

2. The process of claim 1 in which the transparent water insoluble hydrophilic layer is a layer of a film forming colloidal material.

3. The process of claim 1 in which the transparent water insoluble hydrophilic layer is a layer of an organic film forming colloidal material.

4. A process for the preparation of a direct-image photo lithographic master which comprises selectively exposing the surface of a direct image photo lithographic printing plate comprising an electrolytically developable photoconductive sheet material uniformly top-coated with a continuous, transparent, water permeable and water insoluble hydrophilic layer to a light image so as to render the exposed area photoconductive, and electrolytically depositing an oleophobic image on the light struck areas of the lithographic plate.

5. The process of claim 4 wherein the image areas of said lithographic plate are subsequently heated to an elevated temperature.

6. A direct-image photo lithographic printing master comprising a photoconductive sheet material uniformly and continuously top-coated with a transparent water insoluble, water permeable hydrophilic layer and super-imposed on said hydrophilic layer, an oleophilic image selectively deposited on the light-exposed portions of said photoconductive sheet material.

7. A direct-image photo lithographic printing master comprising a dye-sensitized zinc oxide photoconductive sheet material uniformly top-coated with a transparent, continuous, water permeable and water insoluble hydrophilic layer and super-imposed on said hydrophilic layer, an oleophilic image selectively deposited on the light-exposed portions of said photoconductive sheet material.

8. A direct-image lithographic printing master comprising a dye-sensitized photoconductive sheet material of photoconductor particles uniformly bonded to a conductive backing with a hydrophobic binder, said photoconductor sheet material being uniformly top-coated with a continuous, transparent water permeable insoluble hydrophilic layer and super-imposed on said hydrophilic layer, an oleophilic image selectively deposited on the light-exposed portions of said photoconductive sheet material.

9. A process for the preparation of a direct-image photo lithographic master which comprises selectively exposing the surface of a direct image photolithographic printing plate comprising a dye-sensitized photoconductive sheet material uniformly top-coated with a transparent water insoluble hydrophilic layer to a light image so as to render the exposed area photoconductive depositing an oleophilic image on the photoconductive areas of the lithographic plate and heating the image area at an elevated temperature.

References Cited by the Examiner

UNITED STATES PATENTS

| | | | |
|---|---|---|---|
| 2,860,048 | 11/1958 | Deubner | 96—1 |
| 2,886,434 | 5/1959 | Owens | 96—1 |
| 2,952,536 | 9/1960 | Kurz | 96—1 |
| 2,997,387 | 8/1961 | Tananbaum | 96—1 |
| 3,053,179 | 9/1962 | Reithel | 96—1 |
| 3,107,169 | 10/1963 | Bornarth | 96—33 |

FOREIGN PATENTS

| | | |
|---|---|---|
| 210,374 | 3/1956 | Australia. |

NORMAN G. TORCHIN, *Primary Examiner.*

LOUISE P. QUAST, *Examiner.*

A. LIBERMAN, C. E. VAN HORN, *Assistant Examiners.*